United States Patent
Gatellier et al.

(10) Patent No.: US 6,640,772 B2
(45) Date of Patent: Nov. 4, 2003

(54) DIRECT-INJECTION ENGINE WITH SMALL NAPPE ANGLE AND PROCESSES ALLOWING SUCH AN ENGINE TO BE USED

(75) Inventors: Bertrand Gatellier, Bougival (FR); Bruno Walter, Nanterre (FR)

(73) Assignee: Institut Francais Du Petrole, Rueil-Malmaison Cedex (FR)

( * ) Notice: Subject to any disclaimer, the term of this patent is extended or adjusted under 35 U.S.C. 154(b) by 48 days.

(21) Appl. No.: 10/022,218

(22) Filed: Dec. 20, 2001

(65) Prior Publication Data

US 2002/0117146 A1 Aug. 29, 2002

(30) Foreign Application Priority Data

Dec. 20, 2000 (FR) .............................. 00 16823
Jul. 30, 2001 (FR) .............................. 01 10213

(51) Int. Cl.$^7$ ................................. F02B 3/00
(52) U.S. Cl. ...................... 123/298; 123/305
(58) Field of Search ................ 123/298, 305

(56) References Cited

U.S. PATENT DOCUMENTS

| 5,373,820 A | 12/1994 | Sakamoto et al. ......... 123/205 |
| 5,666,916 A | 9/1997 | Fujieda et al. .............. 123/295 |
| 5,906,183 A | 5/1999 | Echtle et al. ............... 123/301 |
| 6,158,409 A | 12/2000 | Gillespie ................. 123/193.6 |
| 6,173,692 B1 * | 1/2001 | Hellmich et al. ........... 123/305 |
| 6,176,215 B1 * | 1/2001 | Baur et al. .................. 123/298 |
| 2002/0000216 A1 * | 1/2002 | Ismailov ..................... 123/305 |
| 2002/0014219 A1 * | 2/2002 | Suzuki et al. ............... 123/305 |
| 2002/0078920 A1 * | 6/2002 | Diel et al. .................... 123/305 |

FOREIGN PATENT DOCUMENTS

| DE | 1055873 | 4/1959 |
| DE | 3327998 | 2/1985 | .......... F02B/23/06 |
| JP | 58032919 | 2/1983 | .......... F02B/23/06 |

* cited by examiner

Primary Examiner—Erick Solis
(74) Attorney, Agent, or Firm—Antonelli, Terry, Stout & Kraus, LLP

(57) ABSTRACT

A direct-injection internal-combustion engine comprising at least one cylinder (1) with a cylinder head (2), a piston (5) sliding in the at least one cylinder, a gas intake and exhaust (3, 4), a combustion chamber defined on one side by the upper face (SP) of the piston (5), the face comprising a projection (7) pointing towards cylinder head (2) and arranged at the center of a concave bowl (8). According to the invention, engine comprises at least one injection nozzle (6) for injecting fuel with a nappe angle ($a_1$) less than or equal to $2\,\mathrm{Arctg}_{2F}^{CD}$, where CD is the diameter of cylinder (2) and F the distance between the point of origin of the fuel jets from injection nozzle (6) and the position of the piston corresponding to a crankshaft angle of 50° in relation to the top dead center (TDC).

15 Claims, 4 Drawing Sheets

-15 dv 0 dv

+15 dv

+30 dv

+40 dv

DIRECT-INJECTION ENGINE WITH SMALL NAPPE ANGLE AND PROCESSES ALLOWING SUCH AN ENGINE TO BE USED

BACKGROUND OF THE INVENTION

1. Field of the Invention

The present invention relates to a direct-injection internal-combustion engine and to processes allowing such an engine to be used.

2. Description of the Prior Art

The state of the art can be illustrated by the following patents: EP-849,448; EP-589,178 corresponding to U.S. Pat. No. 5,363,820; JP-10,184,362; JP-10,184,363; U.S. Pat. No. 3,945,351; GB-2,134,181; DD-147,386.

The development of combustion systems for internal-combustion engines must meet requirements such as emission reduction, torque and specific power increase, combustion noise reduction, while remaining compatible with endurance criteria.

Engineers currently have a wide range of possible modifications allowing these objectives to be reached.

Engineers can change, for example, design or adjustment parameters, like the shape of all or part of the combustion chamber, such as the bowl, provided in the upper part of the piston, in order to facilitate air/fuel mixing.

Engineers can also change the compression ratio, certain parameters of the injection system (pressure, control law, etc.) and of the fuel jets (number of holes, diameter, etc.), the pressure charging adjustment, the EGR (exhaust gas recirculation) ratio or the intake temperature.

Unfortunately, it is increasingly difficult to improve one of these points without deteriorating another one.

A well-known example is the improvement of the following compromise: $NO_x$ emissions/particles emissions.

The problem is even more difficult to solve when endurance criteria have to be taken into account.

This is for example the case for the liquid fuel or the soot in the vicinity of the cylinder walls, whose presence, harmful to the lubricant stability, depends on the nappe angle of the injection nozzle, on the shape of the bowl or on the timing and on the injection pressure. Adjustment of these parameters unfortunately has a harmful effect on the combustion, leading to an emissions increase and/or to a reduction in the full load performances and/or to a noise increase.

Patents EP-849,448 or EP-589,178 notably relate to combustion chambers for internal-combustion engines. These combustion chambers are defined on one side by the upper wall of the piston, which comprises a conical or truncated shaped part referred to as projection pointing towards the cylinder head and having the same axis, at the center of a circular cup or bowl. The fuel is injected through a multijet nozzle in line with each cylinder, with a very wide nappe angle of the order of 140 to 160°. The angle at the top of the projection is suited to the nappe angle of the injection nozzle so that the fuel jets are injected substantially along the slopes of the projection, then diverted thereby and by the rounded shape of the cup towards the top of the cylinder, thus vaporizing without ever touching the walls of the cylinder and therefore without affecting its lubrication. Of course, the pistons have to be quite close to the, top dead center (TDC) thereof for this effect to be obtained. Only a limited latitude is therefore available for selection of the fuel injection times.

This latitude constitutes a drawback that is by no means insignificant since it is also well-known that early and late fuel injections afford many advantages. Thus, a pilot injection before the top dead center and the main injection allows the combustion noise to be reduced. Regeneration of the particle filters, which is initiated, according to a known technique, by raising the exhaust temperature, requires a fuel injection shortly before opening of the exhaust valves. A fuel injection during expansion or during the exhaust phase can also be useful to obtain favorable exhaust conditions allowing regeneration of the $NO_x$ traps.

Since combustion systems generally use injection nozzles with nappe angles ranging between 140° and 160°, the adjustment range of these injections is reduced to limit problems of lubricant dilution by fuel or soot.

In order to overcome this limitation, the present invention is an engine providing combustion allowing substantially varied injection conditions.

SUMMARY OF THE INVENTION

The direct-injection internal-combustion engine according to the invention, comprises at least one cylinder with a cylinder head, a piston sliding in the cylinder, a gas intake and exhaust, a combustion chamber defined on one side by the upper face of the piston comprising a projection pointing towards the cylinder head and arranged at the center of a concave bowl, the combustion chamber comprising at least one injection nozzle for injecting fuel with a nappe angle less than or equal to $2\text{Arctg}_{2F}^{CD}$, where CD is the diameter of the cylinder and F the distance between the point of origin of the jets from the injection nozzle and the position of the piston corresponding to a crankshaft angle of 50° in relation to the top dead center (TDC).

Using an injection nozzle with a relatively narrow nappe angle offers a great latitude for selection of the fuel injection times while avoiding the drawbacks linked with the wide dispersion of the fuel injected, notably regarding wetting of the cylinder walls. This type of injection nozzle is well-suited to the combustion mode referred to as homogeneous combustion.

According to an embodiment, the angle at the top of the projection is selected substantially in accordance with the nappe angle of the injection nozzle and the bowl is so shaped that the injected fuel is diverted towards the cylinder head by following a concave shape of the projection towards the outside of the bowl and vaporized without reaching the walls of the cylinder, for any position of the piston up to ±30° in relation to the top dead center.

The combined use of the injection nozzle with a relatively narrow nappe angle and of a bowl of particular shape allows conventional operation for a fuel injection in the neighborhood of the top dead center, but within a wider angle range than the range that is usually allowed.

The nappe angle of the injection nozzle is advantageously selected between 0° and 120°.

The nappe angle of the injection nozzle is preferably selected between 40° and 100°.

The angle at the top of the projection is selected greater than the nappe angle by a value ranging between 0° and 30°.

The height of the projection is greater than at least 40%, preferably at least 60% of the depth of the bowl.

The fuel jets from the injection nozzle form an intersection angle of the order of 5° with the flank of the projection.

According to a particular feature of the invention, the bowl has a bowl diameter BD, a bowl depth L, a first curvilinear part of radius R1, a second curvilinear part of radius R2, a bowl bottom diameter FD, a lateral wall of inclination $a_3$ and a diametral section length Cb, and the dimensions of the bowl meet at least one of the following conditions:

the BD/L ratio is less than 6 and preferably less than 4;
the BD/R1 ratio is greater than 4;
the R2/R1 ratio ranges between 0.4 and 1;
the FD/BD ratio is less than 0.8;
the Cb/BD ratio is less than 2;
the angle of inclination $a_3$ is less than 45°.

The angle of inclination is negative so that the bowl has a re-entering neck which limits an outlet section of the bowl.

The neck is arranged at a height that is less than the total height of the bowl.

The dimensions of the bowl meet one of the following conditions:

the GD/BD ratio is less than 1;
the L2/L ratio is less than 1;
the S/V ratio is less than 0.1 $mm^{-1}$.

The process according to the invention for improving the latitude of operation of a direct-injection internal-combustion engine comprises at least one cylinder, a piston sliding in this cylinder, a gas intake and exhaust, a combustion chamber defined on one side by the upper face of the piston comprising a projection pointing towards the cylinder head at the center of a bowl, the fuel is injected into each cylinder through an injection nozzle with a nappe angle that is less than or equal to $2 \text{Arctg}_{2F}{}^{CD}$, where CD is the diameter of the cylinder and F the distance between the point of origin of the fuel jets from the injection nozzle and the position of the piston corresponding to a crankshaft angle of 50° in relation to the top dead center (TDC).

A piston in accordance with the invention is such that the angle at the top of the projection is substantially in accordance with the nappe angle of the injection nozzle, and a bowl whose wall is so shaped that the injected fuel is guided towards the outside thereof and vaporized without reaching the cylinder walls, for any position of the piston up to ±30° in relation to the top dead center.

The invention avoids the presence of liquid fuel on the cylinder walls while affording variable engine performance and pollution control possibilities.

A process of the invention for improving the latitude of operation of a direct-injection internal-combustion engine comprises at least one cylinder, a piston sliding the at least one cylinder, a gas intake and exhaust, a combustion chamber defined on one side by an upper face of the piston comprising a projection pointing towards the cylinder head, comprises:

for low and average loads, injecting fuel into each cylinder through an injection nozzle with a nappe angle less than or equal to $2 \text{Arctg}_{2F}{}^{CD}$, where CD is the diameter of the cylinder and F is the distance between the point of origin of fuel jets from the injection nozzle and the position of the piston corresponding to a crankshaft angle of 50° in relation to the top dead center (TDC) to provide a long mixing time of the fuel with the air admitted before combustion of this mixture, for high loads, injecting the fuel through the same injection nozzle with the same nappe angle, so as to obtain stratified mixing of the fuel with air and a progressive combustion.

At full load and at high loads, the engine according to the invention allows good carry-over of the vapor fuel thus favoring mixing thereof with the air in order to obtain a good combustion rate and high air/fuel ratios as a result of a good use of the air admitted. At partial loads, a reduced nappe angle allows a wide injection system adjustment latitude without the cylinder walls being wetted.

BRIEF DESCRIPTION OF THE DRAWINGS

Other features and advantages of the system according to the invention will be clear from reading the description hereafter, given by way of non limitative example, with reference to the accompanying drawings wherein.

DESCRIPTION OF THE PREFERRED EMBODIMENTS

Figure 1:
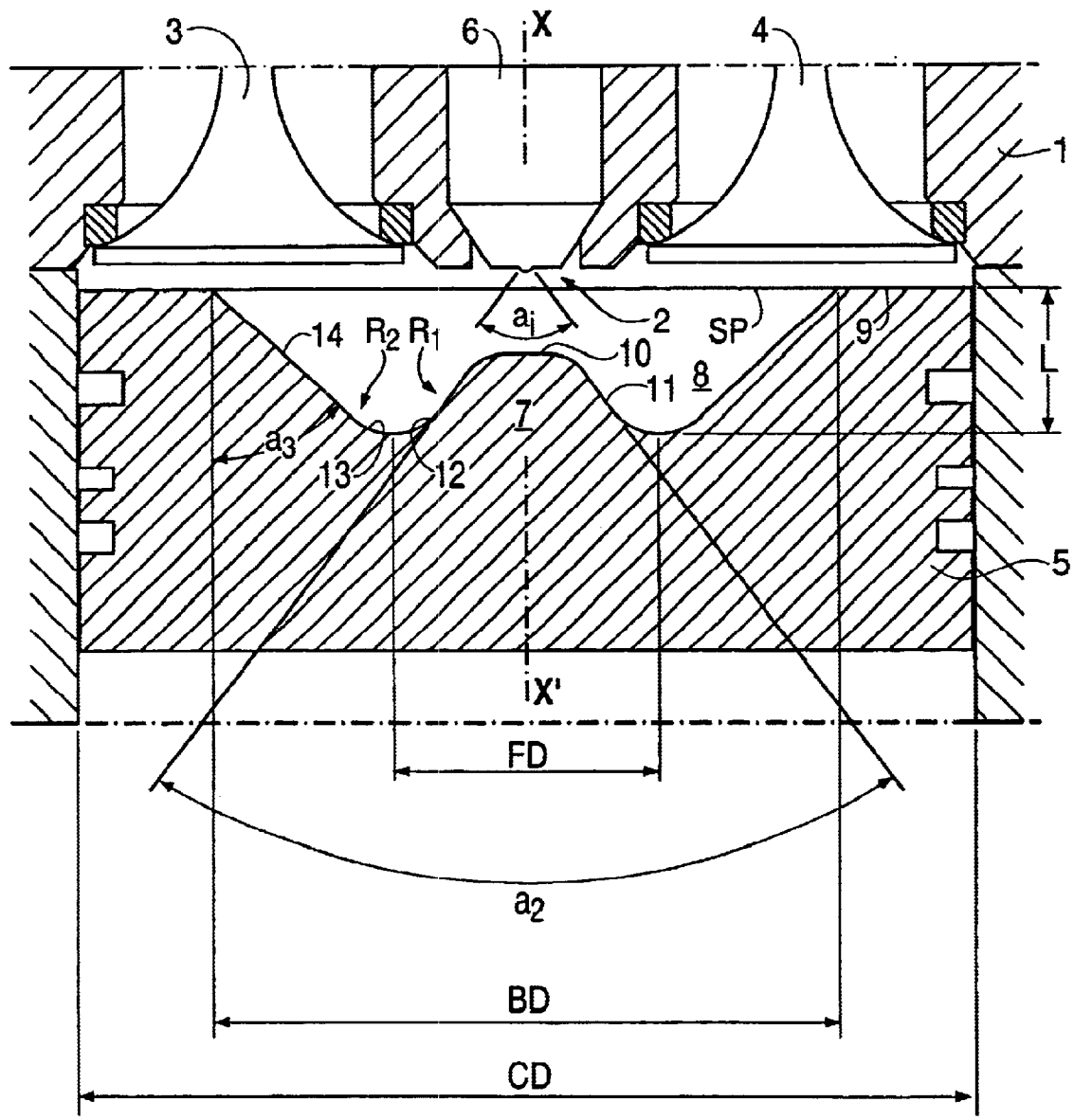
FIG. 1 diagrammatically shows an internal-combustion engine provided with a fuel injection nozzle with a narrow nappe angle and a piston surface of carefully designed profile affording a greater latitude as regards selection of the possible injection times.
Figure 2:
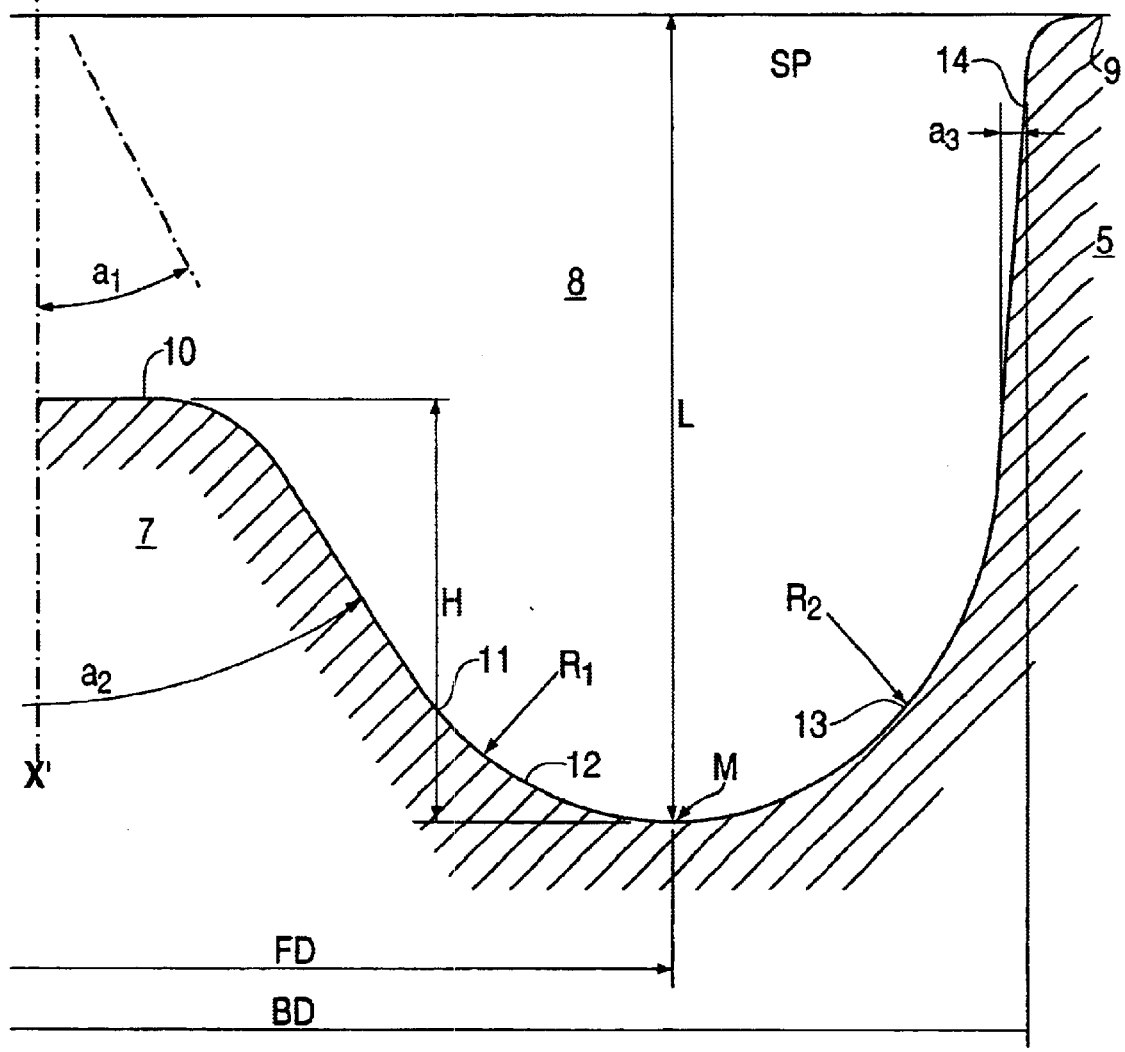
FIG. 2 is a large-scale partial local view of a modified profile of the bowl of the piston of FIG. 1.

With reference to FIGS. 1 and 2, an internal-combustion engine provided with a fuel injection nozzle, of Diesel type for example, comprises at least one cylinder 1 of axis XX' with a cylinder head 2, air intake and burnt gas exhaust, in the present case respectively one or more intake valves 3, one or more exhaust valves 4, a piston 5 sliding in cylinder 1 and a fuel injection nozzle 6 such as a multijet nozzle, preferably arranged in line with axis XX' of the cylinder.

Of course, it is possible for the injection nozzle not to be arranged in line with axis XX' but, in this case, the general axis of the fuel jet nappe from this fuel injection nozzle is coaxial to this axis XX'.

The fuel injection nozzle has a small nappe angle $a_1$, nappe angle $a_1$ being selected at most equal to 120° and preferably ranging between 40° and 100°.

This nappe angle is so selected that the walls of the cylinder are never wetted by the fuel for any position of the piston ranging between +50° and +α or between −50° and α, where α represents the crankshaft angle for the injection phase selected in relation to the top dead center (TDC), this angle α being greater than 50° and less than or equal to 180° to obtain a homogeneous type combustion.

If CD represents the diameter of cylinder 1 and F the distance between the point of origin of the jets from injection nozzle 6 and the position of the piston corresponding to a crankshaft angle of 50°, nappe angle $a_1$, will be less than or equal to $2 \text{Arctg}_{2F}{}^{CD}$.

A typical angle range for nappe angle $a_1$, ranges for example between 40° and 100°.

The invention thus allows obtaining a great latitude for the selection of the injection times since the injection nozzle as defined above provides a fuel jet nappe that will not wet the cylinder walls for an injection ranging between the positions of the piston corresponding to a crankshaft angle ranging between 50° and +α or between −50° and +α, where α represents the crankshaft angle for the injection phase selected in relation to the top dead center (TDC), this angle a being greater than 50° and less than or equal to 180°.

In fact, as has been shown many times the configuration of the fuel nappe is such that it comes out of the injection nozzle, according to an axial section, in form of a triangle and it ends, still with an axial section, in a semicircle whose diameter is equal to the base of the triangle.

The combustion chamber is defined on one side by cylinder head 2 and, on the opposite side, by upper face SP of piston 5.

This face comprises a projection 7 whose axis is coaxial to the axis of the fuel nappe coming from injection nozzle 6, which points towards cylinder head 2 at the center of a bowl 8 whose axis is also coaxial to the axis of the fuel jet nappe from nozzle 6. The concave part of this bowl is pointed towards this cylinder head 2 and opens onto a substantially horizontal part 9 of the piston.

Of course, the axis of the bowl may not be coaxial to that of the cylinder, but a main point is that the axis of the fuel jet nappe, the axis of the projection and the axis of the bowl are coaxial.

The truncated projection 7 comprises a substantially horizontal vertex 10 extending, in the direction of the bowl bottom, by a substantially rectilinear flank 11. The angle at vertex $a_2$ of projection 7 is substantially suited to the nappe angle $a_1$, of injection nozzle 6 so that the fuel is injected substantially along flank 11 of the projection when the piston is in the vicinity of the top dead center (TDC).

The diametral section Cb of bowl 8 is curvilinear and comprises, from the top of projection 7 symmetrically towards the outside of piston 5, on either side of its axis (merging with axis XX' here), vertex 10 of the projection with a curved connection for the rectilinear part formed by flank 11, the flank extending by a first curvilinear part 12 of radius of curvature R1, a second curvilinear part 13 of radius of curvature R2 and ending at a substantially rectilinear inclined lateral wall 14 joining the substantially horizontal part 9 of upper face SP of piston 5.

L represents the depth of bowl 8, BD the diameter of the opening of the bowl, CD the diameter of the cylinder, $_2{}^{Cb}$ the length of the diametral half-section of bowl 8 from the vertex of projection 7, considered at the intersection of this vertex with the axis passing through the fuel jet nappe (axis XX' here), up to its connection with the upper face of piston 5 (the developed length of the diametral section of the bowl is therefore $_2{}^{Cb}$), $a_3$ the angle formed by wall 14 of the bowl in relation to a vertical, here a line parallel to axis XX' which, in the example of this figure, also corresponds to a line parallel to the axis of the jets from nozzle 6, and FD the mean diameter of bowl 8 considered from the bottom thereof. In the case of FIG. 1, diameter FD is considered at the lowest point M of the bowl, i.e. at the intersection between radii R1 and R2. In a configuration where the lowest point of the bowl is a plane zone, diameter FD is to be considered as the diameter taken at the median of this plane zone.

The shape of bowl 8 is compatible with the nappe angle $a_1$ selected. It is so designed as to allow, in the conventional type operating mode (for any position of piston 5 up to ±30° in relation to the top dead center (TDC) for example), to obtain the desired effect of diversion of the injected fuel towards the cylinder head (along the concave part thereof towards the outside of the bowl) and its vaporization without wetting the cylinder walls.

This shape is preferably obtained by meeting the following conditions:

the BD/L ratio is less than 6 and preferably less than 4;
the BD/R1 ratio is greater than 4;
the R2/R1 ratio ranges between 0.4 and 1;
the FD/BD ratio is less than 0.8; and
the Cb/BD ratio is less than 2.

An angle less than 45° (FIG. 1) and advantageously substantially equal to 20°, as illustrated in FIG. 2, is preferably selected for $a_3$.

The height H of projection 7, considered at the bottom of bowl 8 up to vertex 10, is advantageously less than depth L of bowl 8.

Thus, upon fuel injection, the fuel jets will mix along flank 11 with air (or a mixture of recirculated exhaust gas and air) previously allowed to pass into the combustion chamber, then they will be guided by parts 12 and 13 associated with wall 14 so that they cannot come into contact with the walls of cylinder 1.

Figure 3:
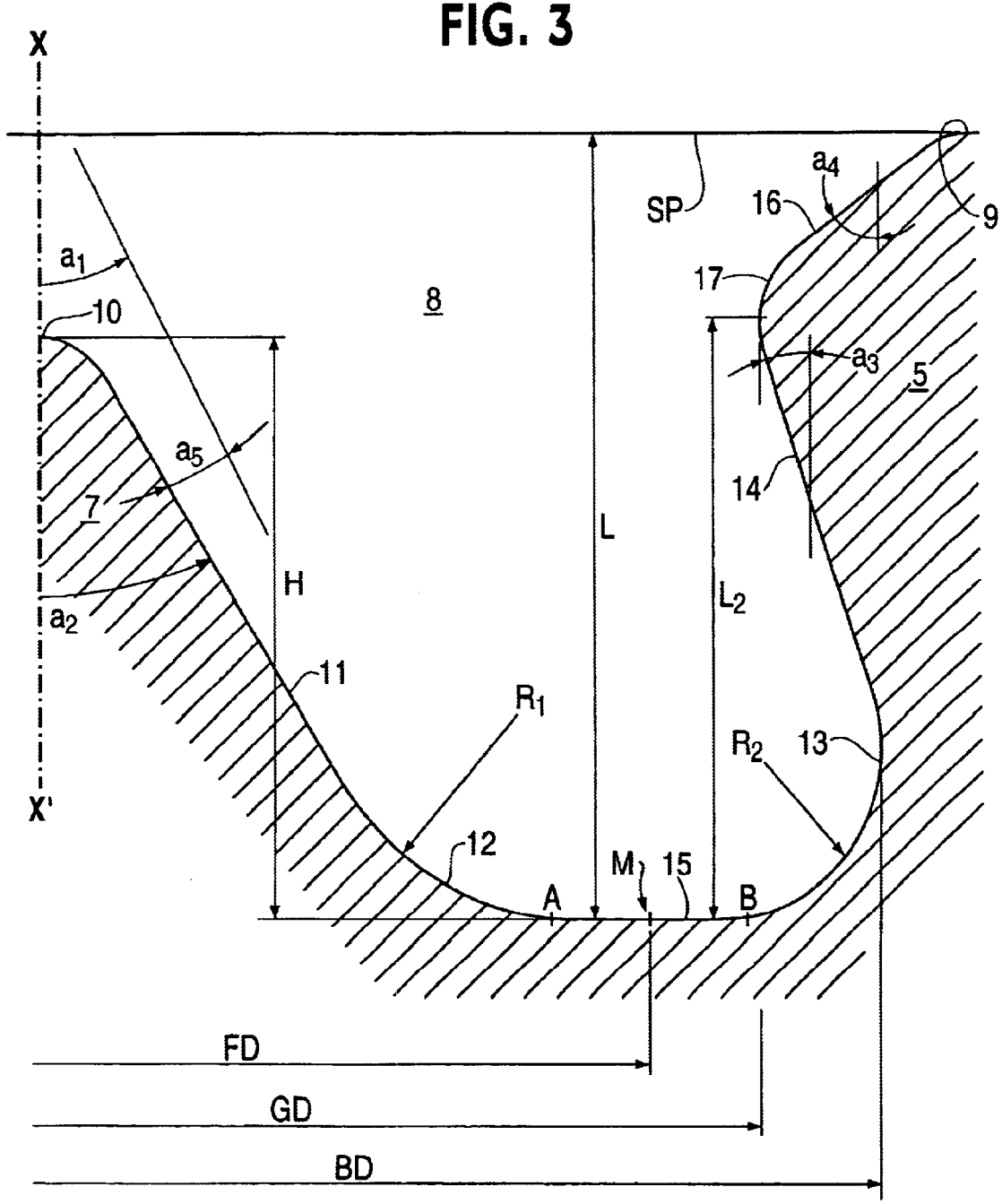
FIG. 3 illustrates a large-scale partial local view of another profile of the piston bowl.
Figure 4A:
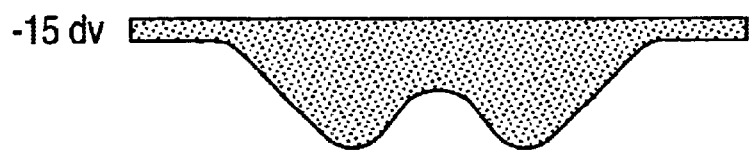
FIGS. 4a to 4e show various stages of the fuel combustion according to the invention and for full-load running conditions.
Figure 4B:
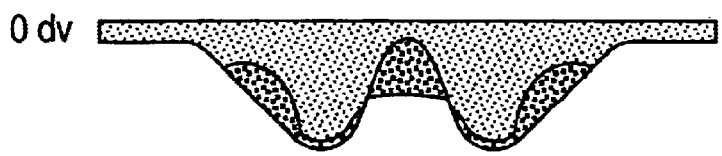
Figure 4C:
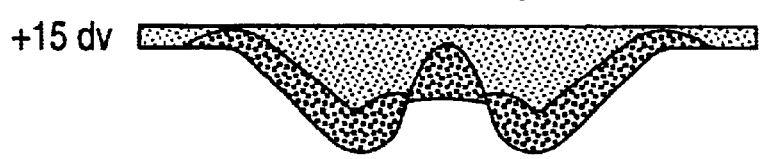
Figure 4D:
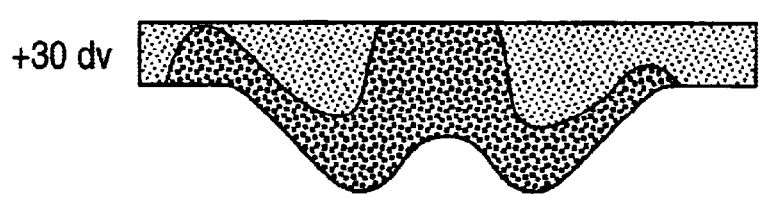
Figure 4E:
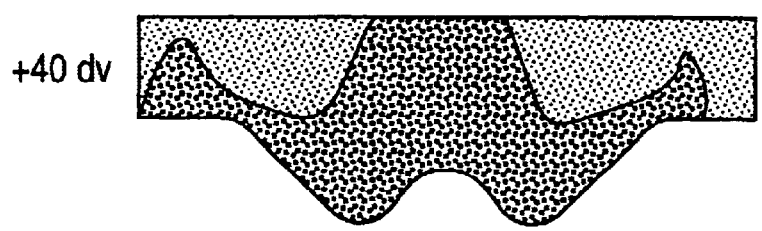

FIG. 3 shows another example of a bowl profile contained in piston 5.

Piston 5 of axis XX' comprises a bowl 8 whose concave part points towards the cylinder head (not shown) and which comprises a projection 7.

The projection, situated at the center of bowl 8, which is also coaxial to the axis of the fuel jet nappe, has a more tapered shape than the projection shown in FIGS. 1 and 2, with a conical shape whose vertex 10 is slightly rounded and whose base surface is smaller than that of FIGS. 1 and 2.

This vertex extends by a substantially rectilinear flank 11 in the direction of the bowl bottom, then by a first curvilinear part 12 of radius of curvature R1, a substantially horizontal plane wall 15 forming the bottom of the bowl, a second curvilinear part 13 of radius of curvature R2, an inclined wall 14 forming the lateral wall of the bowl and an inclined surface 16 connected to wall 14 by a shoulder 17, the inclined surface 16 leading to the horizontal part 9 of upper face SP of piston 5.

The length of the diametral section Cb is twice the length from the intersection of vertex 10 of projection 7 with the geometric axis of the projection which in this case merges with axis XX', up to the connection of inclined surface 16 with the upper face of piston 5.

In the example of FIG. 3, the angle at the vertex $a_2$ of the projection is suited to nappe angle $a_1$ so that the fuel is injected substantially along flank 11 and the projection has a height H which is greater than at least 40% of the depth L of bowl 8, a depth considered between horizontal part 9 of piston 5 and bottom wall 15, the height being greater, in the example of FIG. 3, than 60% of the depth of the bowl.

Angle $a_3$ formed by lateral wall 14 of the bowl with a vertical, considered between shoulder 17 and curvilinear part 13, is substantially identical to the angle described in connection with FIGS. 1 and 2, but has the distinctive feature of being negative, i.e. considered in the opposite direction to that of FIGS. 1 and 2.

Thus, lateral wall 14 forms a re-entering part at the outlet of bowl 8, which constitutes a neck 17 formed by the shoulder between wall 14 and surface 16 which is inclined at an angle $a_4$ formed by a vertical passing through one of the points of this surface, this angle $a_4$ being preferably greater than 5°.

The bowl of FIG. 3 thus has:

a bowl opening diameter BD, with a radius considered in the vicinity of the bowl bottom and corresponding to a distance taken between axis XX' and the farthest point of second curvilinear part 13, a bowl bottom diameter FD whose radius corresponds to a distance between axis XX' and mid-point M of segment AB defining the bowl bottom formed by plane wall 15, a neck diameter GD with a radius corresponding to the distance between axis XX' and the end of neck 17 opposite projection 7, which delimits the outlet section of the bowl, a neck depth L2 considered at neck diameter GD and extending from neck 17 to bottom wall 15.

This other bowl profile shape also meets the ratio conditions listed above, to which the following ratios are added: L2/L is less than 1, outlet section S of the bowl (considered at diameter GD) divided by the total volume V of the bowl is less than 0.1 mm$^{-1}$ and GD/BD is less than 1.

A ratio S/V is preferably equal to about 0.05 mm$^{-1}$.

As can be seen in FIG. 3, neck diameter GD is less than bowl diameter BD, which restricts the outlet section considered at diameter GD and thus to obtain a higher displacement rate of the fuel mixture. In addition, the negative inclination of angle $a_3$ has the advantage of orienting the fuel jets towards axis XX' and thus avoiding contact of the fuel with the cylinder walls.

Furthermore, the height H of projection 7 provides better separation the fuel jets coming from the injection nozzle and better release of jets in their vapor form because the volume of air contained between flank 11 of the projection and the fuel jets is greater.

The fuel jets preferably form an intersection angle $a_5$ of the order of 5° with flank 11.

Of course, the present invention is not limited to the embodiment examples described above; it can also be implemented in a process using an engine that allows, for low and average loads, injection of the fuel into each cylinder by means of an injection nozzle having a nappe angle $a_1$, as defined above, so that the fuel jets do not touch the walls of cylinder 1 for any position of piston 5 ranging between +50° and +α or between −50° and −α in relation to the top dead center (where α is, as described above, greater than 50° and less than or equal to 180°) so as to obtain long mixing times for the fuel with the air prior to combustion of this mixture and, for high loads, injection of the fuel through the same injection nozzle with the same nappe angle, so as to obtain stratified mixing of the fuel with the air and a progressive combustion.

By way of example, FIGS. 4a to 4e show at various stages of the combustion at full load (between −15 and +40° crankshaft) that the injected fuel is guided along the concave parts of the bowl.

In these FIGS. 4a–4e the black areas represent the injected fuel, the light shaded areas represent the air, and the dark shaded areas represent a mixture of vaporized fuel and air.

What is claimed is:

1. A direct-injection internal-combustion engine comprising at least one cylinder with a cylinder head, a piston sliding in the at least one cylinder, a gas intake and exhaust, a combustion chamber defined on one side by an upper face of said piston comprising a projection pointing towards the cylinder head and arranged at a center of a concave bowl, and comprising at least one injection nozzle for injecting fuel with a nappe angle ($a_1$) less than or equal to $2\operatorname{Arctg}_{2F}^{CD}$, where CD is the diameter of cylinder and F a distance between the point of origin of fuel jets from the at least one injection nozzle and a position of the piston corresponding to a crankshaft angle of 50 in relation to the top dead center.

2. An engine as claimed in claim 1, wherein an angle at a vertex of the projection is selected substantially in accordance with nappe angle ($a_1$) of nozzle and bowl is so shaped that injected fuel is diverted towards the cylinder head by following concave parts towards an outside of the bowl and vaporized without reaching a cylinder wall, for any position of piston up to ±30° in relation to the top dead center.

3. An engine as claimed in claim 1, wherein nappe angle ($a_1$) of the injection nozzle is selected between 0° and 120°.

4. An engine as claimed in claim 1, wherein the nappe angle ($a_1$) of injection nozzle is selected between 40° and 100°.

5. An engine as claimed in claim 3, wherein an angle ($a_2$) at the vertex of projection is selected greater than the nappe angle ($a_1$) by a value ranging between 0° and 30°.

6. An engine as claimed in claim 1, wherein a height the projection is greater than at least 40% of a depth of bowl.

7. An engine as claimed in claim 1, wherein a height of the projection is greater than at least 60% of the depth of bowl.

8. An engine as claimed in claim 1, wherein the fuel jets from injection nozzle form an intersection angle ($a_5$) of the order of 5° with a side of the projection.

9. An engine as claimed in claim 1, wherein the bowl comprises a bowl diameter BD, a bowl depth, L, a first curvilinear part of radius R1, a second curvilinear part of radius R2, a bowl bottom diameter FD, a lateral wall of inclination ($a_3$) and a diametral section length Cb, wherein dimensions of the bowl meet at least one of the following conditions:

the BD/L ratio is less than 6 and preferably less than 4;

the BD/R1 ratio is greater than 4;

the R2/R1 ratio ranges between 0.4 and 1;

the FD/BD ratio is less than 0.8;

the Cb/BD ratio is less than 2;

the angle of inclination ($a_3$) is less than 450.

10. An engine as claimed in claim 9, wherein an inclination angle ($a_3$) is negative so that the bowl has a re-entering neck which defines an outlet diameter of the bowl.

11. An engine as claimed in claim 10, wherein the neck has a height that is less than a total height of the bowl.

12. An engine as claimed in claim 10, wherein dimensions of the bowl meet one of the following conditions:

the GD/BD ratio is less than 1;

the L2/L ratio is less than 1;

the SN ratio is less than 0.1 mm$^{-1}$, S being the outlet section considered at diameter GD and V the total volume of the bowl.

13. A process for improving the latitude of operation of a direct-injection internal-combustion engine comprising at least one cylinder, a piston sliding in this cylinder, a gas intake and exhaust, a combustion chamber defined on one side by an upper face of the piston comprising a projection pointing towards cylinder head, at a center of a bowl, wherein fuel is injected into each cylinder through an injection nozzle having a nappe angle ($a_1$) less than or equal to $2\operatorname{Arctg}_{2F}^{CD}$, where CD is the diameter of cylinder and F the distance between a point of origin of fuel jets from injection nozzle and a position of the piston corresponding to a crankshaft angle of 50° in relation to top dead center.

14. A process as claimed in claim 13, wherein the piston is shaped such that an angle at a vertex ($a_2$) of projection is substantially in accordance with a nappe angle ($a_1$) of injection nozzle and a bowl having a wall shaped so that injected fuel is guided towards an outside thereof and vaporized without reaching a wall of the cylinder, for any position of the piston up to ±30° in relation to the top dead center.

15. A process for improving a range of operation of a direct-injection internal-combustion engine comprising at least one cylinder, a piston sliding in this cylinder, a gas intake and exhaust, a combustion chamber defined on one side by an upper face of piston comprising a projection pointing towards a cylinder head, at a center of a bowl, comprising:

For lower loads, injecting fuel into each cylinder through an injection nozzle with a nappe angle ($a_1$) less than or equal to $2\text{Arctg}_{2F}^{CD}$, where CD is the diameter of cylinder and F is a distance between a point of origin of fuel jets from an injection nozzle and a position of the piston corresponding to a crankshaft angle of 50° in relation to top dead center so as to lengthen mixing time of fuel with the air admitted before combustion of this mixture, and for higher leads, injecting the fuel through the injection nozzle with the nappe angle, so as to obtain stratified mixing of the fuel with the air and a progressive combustion.

* * * * *